United States Patent [19]

Ryan, III et al.

[11] Patent Number: 6,007,326
[45] Date of Patent: Dec. 28, 1999

[54] LOW $NO_x$ COMBUSTION PROCESS

[75] Inventors: Harry Monroe Ryan, III, Port Chester; Arthur Wellington Francis, Jr., New York, both of N.Y.; Michael Francis Riley, Danbury, Conn.; Hisashi Kobayashi, Putnam Valley, N.Y.

[73] Assignee: Praxair Technology, Inc., Danbury, Conn.

[21] Appl. No.: 08/905,344

[22] Filed: Aug. 4, 1997

[51] Int. Cl.[6] .............................. F23M 3/04; F23D 14/00; F23C 1/10
[52] U.S. Cl. ................ 431/9; 431/5; 431/8; 431/10; 431/12; 431/164; 110/261
[58] Field of Search ............................ 431/5, 8, 9, 10, 431/12, 164, 165, 175, 351; 110/261, 260, 347, 348

[56] References Cited

U.S. PATENT DOCUMENTS

| | | | |
|---|---|---|---|
| 4,378,205 | 3/1983 | Anderson | 431/9 |
| 4,719,877 | 1/1988 | Delage | 431/275 |
| 4,863,371 | 9/1989 | Ho | 431/9 |
| 4,957,050 | 9/1990 | Ho | 431/9 |
| 4,988,285 | 1/1991 | Delano | 431/5 |
| 5,006,062 | 4/1991 | Lee et al. | 432/14 |
| 5,076,779 | 12/1991 | Kobayashi | 431/5 |
| 5,201,650 | 4/1993 | Johnson | 431/9 |
| 5,411,394 | 5/1995 | Beer et al. | 431/9 |
| 5,554,022 | 9/1996 | Nabors, Jr. et al. | 431/10 |
| 5,725,366 | 3/1998 | Khinkis et al. | 431/10 |
| 5,772,421 | 6/1998 | Besik et al. | 431/8 |

OTHER PUBLICATIONS

Ryan et al., "Dilute Oxygen Combustion", International Energy Agency Task Leaders Meeting, (Aug., 1996).
Ryan et al., "Dilute Oxygen Combustion", American Flame Research Committee International Symposium, (Sep., 1996).

Primary Examiner—Ira S. Lazarus
Assistant Examiner—David Lee
Attorney, Agent, or Firm—Stanley Ktorides

[57] ABSTRACT

A low $NO_x$ combustion process is carried out by reacting low concentrations of combustibles with low concentrations of oxygen. These low concentrations are obtained by injecting high velocity fuel and oxidant streams through port openings that are spatially separated.

13 Claims, 5 Drawing Sheets

LOW $NO_X$ COMBUSTION PROCESS

FIELD OF THE INVENTION

The invention relates generally to combustion, in particular, to post-mix combustion taking place in a furnace.

BACKGROUND OF THE INVENTION

A number of techniques have been developed to reduce the amount of nitrogen oxides ($NO_x$) generated from combustion processes. They include techniques that employ (a) post-combustion clean-up strategies such as selective non-catalytic reduction (SNCR) and selective catalytic reduction (SCR); (b) modification of operating conditions, for example adjustments in air/fuel ratios; (c) modifications of burner internals, with air staging and fuel staging illustrating this type of approach; and (d) modification of the combustion system, in particular, through the use of flue gas recirculation systems.

The majority of these techniques have been developed in relation to air-based combustion processes. As combustion systems that use oxygen or oxygen-enriched air are being adopted by a number of industries, $NO_x$ reduction techniques must address those aspects in the generation of $NO_x$ that are specific to oxygen-based combustion processes.

It is known that the amount of nitric oxides ($NO_x$) produced in combustion increases with temperature and with the oxygen and nitrogen concentrations. When air is replaced with pure, nearly pure or with oxygen-enriched air, two competing effects are observed. On one hand, the amount of nitrogen available to form $NO_x$ is lowered; on the other, the flame temperature is increased. It must be noted, however, that even when the combustion is carried out using technically pure oxygen (oxygen concentration of 99.5% or higher), nitrogen levels in the furnace can be significant due to air infiltration through leaks in the furnace, or to using both oxygen-fired and air-fired burners.

One advance in lowering $NO_x$ levels generated during oxygen-based combustion processes involves mixing the oxidant stream with species present in the furnace prior to contact with the fuel stream. Although $NO_x$ reductions obtained by this technique are excellent, federal and state regulations are placing increasingly stringent targets for $NO_x$ emissions. Accordingly, there continues to be a need for combustion processes which generate lower and lower $NO_x$ levels and are still capable of effectively heating industrial furnaces such as might be used in glass or steel making.

It is an object of this invention to provide a process for manipulating the combustion system in order to reduce the generation of $NO_x$.

SUMMARY OF THE INVENTION

The above and other objects, which will become apparent to one skilled in the art upon a reading of this disclosure, are attained by the present invention which is:

A combustion process with reduced generation of $NO_x$ comprising:

A combustion process with reduced generation of $NO_x$ comprising:

(A) providing a furnace containing furnace gases comprising non-reactive species at a temperature exceeding 1000° F.;

(B) providing into the furnace at a fuel injection point a fuel stream comprising combustibles and having at least one of: (i) a swirl motion (ii) a velocity of at least 100 m/s;

(C) providing into the furnace at an oxidant injection point spaced from the fuel injection point, an oxidant stream having an oxygen concentration greater than 21 volume percent and having at least one of: (i) a swirl motion (ii) a velocity of at least 75 m/s;

(D) mixing the fuel stream with furnace gases within the furnace to produce a fuel reactant having a concentration of combustibles which is not more than 10 volume percent;

(E) mixing the oxidant stream with furnace gases within the furnace to produce an oxidant reactant having an oxygen concentration which is not more than 10 volume percent; and (F) reacting the fuel reactant with the oxidant reactant.

As used herein the term "nitrogen oxides" or "$NO_x$" refers in particular to the combined species of nitric oxide (NO) and nitrogen dioxide ($NO_2$).

As used herein the term "products of combustion" primarily includes carbon dioxide ($Co_2$) and water ($H_2O$) but may also include nitrogen ($N_2$), carbon monoxide (CO), oxygen ($O_2$), hydrogen ($H_2$) and hydrocarbons, for example aldehydes.

As used herein, the term "combustibles" refers to species which, under the conditions present in the furnace, are capable of participating in a combustion reaction with oxygen. Fuel species injected into the furnace to carry out the combustion process, for example, methane, butane, propane, etc. are the major components of combustibles; in addition, other species that are capable of reacting with oxygen, for example, carbon monoxide (CO) and hydrogen ($H_2$), may be also present in the furnace.

As used herein, the term "nonreactive species" refers to compounds present in the furnace which are inert with respect to the combustion reaction taking place between combustibles and oxygen. Examples of nonreactive species include, for example, $H_2O$, $CO_2$ and $N_2$.

As used herein the term "furnace gases" refers to the gaseous atmosphere present in the furnace.

DETAILED DESCRIPTION OF THE INVENTION

Figure 1D:
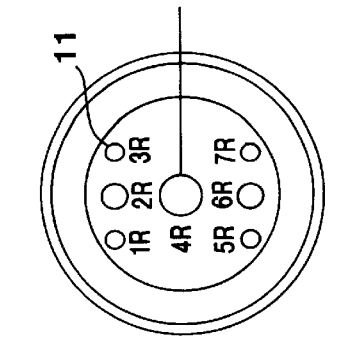
FIG. 1 is a schematic representation of a furnace that can be used to practice the invention.
Figure 1B:
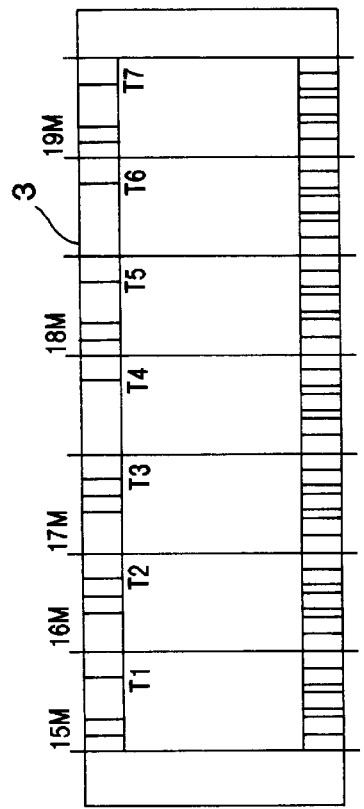

The invention is related to post mix combustion methods in which fuel and oxidant are injected separately into a combustion chamber, for example a furnace. According to one preferred embodiment of the invention, the fuel and the oxidant are provided by means other than through conventional post-mix burners.

In order to initiate the combustion process disclosed herein, the combustion chamber or furnace must provide a temperature that is greater than the auto-ignition temperature of the reactants involved. Generally, furnace gases within the furnace must be at a temperature exceeding 1000° F. For a natural gas and oxygen combination, for example, the temperature of the combustion region must in fact be greater than 1400° F. Accordingly, the invention may be practiced in high temperature industrial furnaces such as glass melting, steel reheat and others.

Although the invention is useful in the context of air-based combustion systems, it is particularly advantageous to combustion processes using oxidants having an oxygen content higher than that of air. For example, the invention can be practiced by combusting oxygen obtained from cryogenic or non-cryogenic air separation sources. It can also be practiced by combusting oxygen-enriched air with an oxygen content higher than 21% vol.

According to one embodiment of the invention, the preferred fuel is gaseous, such as, for example, natural gas, methane, propane, butane, coke oven gas, other hydrocarbon gases, as well as other suitable gaseous fuels.

In one preferred embodiment, the fuel and the oxidant are close to or at the ambient temperature. However, the invention may also be practiced with fuel and/or oxidant streams that have temperatures that are higher or considerably higher. This is particularly advantageous since conducting oxygen-based combustion using preheated oxidant and/or preheated fuel through conventional burners is expected to increase the flame temperature and thus the $NO_x$ emissions. Generally, within the constraints of the equipment, process and materials used, the fuel and oxygen may be-preheated to any temperature above ambient. Accordingly, the invention can be used to minimize the generation of $NO_x$ in the context of heat recovery or heat integration schemes where the fuel and/or the oxidant streams are preheated before they are injected and combusted inside the furnace; for example the preheating may be by heat exchange with hot flue gases. In such cases, preheating of the fuel and oxidant may be modest, for example to temperatures of about 400° F. for fuel and about 200° F. for the oxidant; or it may be to higher temperatures, for example of about 1000° F. for the fuel and about 1500° F. for the oxidant. If needed, even higher oxidant and fuel temperatures, such as for example about 2000° F., may be handled by the combustion process described herein.

The invention discloses a combustion process aimed at decreasing $NO_x$ formation. According to the invention, both oxidant and fuel are injected into the furnace in a manner designed to minimize any combustion reactions until the concentration of oxygen and that of combustibles have been reduced. In the practice of the invention, the combustion reaction is carried out using an oxidant reactant having an oxygen concentration below 10% by volume and a fuel reactant having a concentration of combustibles below 10% by volume. Preferably there is employed an oxidant reactant with an oxygen concentration below 5% by volume and a fuel reactant having a concentration of combustibles below 5% by volume. Most preferably there is employed an oxidant reactant having an oxygen concentration below 2% by volume and a fuel reactant having a concentration of combustibles below 2% by volume. The balance species consist primarily of hot nonreactive species; in the case of oxygen-fired combustion processes these are primarily $CO_2$ and $H_2O$.

It was discovered that one of the factors contributing to obtaining the low concentrations desired herein is related to the location of fuel and oxidant injection points. The oxidant stream is injected at a point that is spaced away from the injection point of the fuel stream. Generally, this distance is greater than distances that are available using conventional post-mixed burners. A number of arrangements can be envisioned, with both injection points being on the same furnace wall, or on different walls, such as walls adjacent or opposite each other. When on the same furnace face or wall, the injection points can be spaced from each other in any direction, for example, vertically, horizontally or diagonally. Several such arrangements may be employed in the furnace. In addition, as long as the desired concentrations can be obtained, two or more oxidant injection points can be provided for one fuel injection point; alternatively, two or more fuel injection points can be provided for one oxidant injection point.

For arrangements where both oxidant and fuel are injected from the same wall, it is a preferred embodiment of the invention to place the injection points at least 6 inches (152 mm) apart, as measured from the center of the injection points. It was discovered that lower $NO_x$ emissions could be obtained by increasing the separation of the injection points; a spacing of 24 inches, for example, was found to test very well with respect to reducing $NO_x$ formation.

Providing the necessary spacing between the injection points of fuel and oxidant helps to ensure that the combustion reaction is delayed until mixing furnace gases into the fuel stream and, independently, into the oxidant stream can lower the concentrations of oxygen and of combustibles to the desired levels.

Another factor that was discovered to be important in achieving the reduced concentrations useful in carrying out the invention is related to the entrainment characteristics of both fuel and oxidant streams or jets. By injecting fuel and oxidant in a manner that enhances entrainment of furnace gases into the two separate jets, the concentrations of oxygen as well as that of combustibles can be lowered before carrying out the combustion reaction. Furnace gases contain products of combustion (primarily $CO_2$ and $H_2O$), combustibles, molecular nitrogen ($N_2$), oxygen ($O_2$) and others. By injecting both the fuel and the oxidant at high velocities, the turbulence of the two streams or jets and the entrainment of furnace gases are enhanced. It is expected that low $NO_x$ emission can be obtained for fuel and oxidant Mach numbers between 0.25 and 1.0. For example, the fuel stream may be injected at velocities exceeding 100 meters/second (m/s) and the oxidant stream at velocities exceeding 75 m/s. Velocities that have been found particularly useful in carrying out the invention range from about 133 m/s to about 290 m/s for the fuel jet and from about 200 m/s to about 250 m/s for the oxidant jet.

Good entrainment of furnace gases into the oxidant, fuel, or both may also be obtained by imparting an angular or tangential component to the jet flow, such as, for example, by using a swirl. Techniques for generating a swirling fluid flow are known in the art. For instance, swirl motion may be imparted by placing a plurality of vanes in the vicinity of the injection point of fuel, oxidant or both; for such an arrangement, the degree of swirling may be varied by adjusting the angle of the vanes.

According to one embodiment of the invention, both the fuel and the oxidant may have a swirl motion. According to another embodiment, only one of the jets may have a swirl motion while the other may be injected at high velocity, essentially as discussed above.

It is believed that by injecting fuel and oxidant as described herein, recirculation patterns are established within the furnace and large amounts of nonreactive species, such as $CO_2$, $H_2O$ and $N_2$ are mixed into the fuel stream and into the oxidant stream. In addition to their role in providing heat for the autoignition of fuel and oxygen, these nonreactive species are believed to affect the mechanism of $NO_x$ formation. It is believed, for example, that the nonreactive species provide a heat sink, thereby lowering the flame temperature and therefore the generation of $NO_x$ via what is known as the thermal (Zeldovich) mechanism. In addition, it is believed that lowering the oxygen concentration by mixing oxidant with furnace gases also favors low $NO_x$ generation via this mechanism.

$NO_x$ formation, however, can occur via at least two other pathways. The prompt (Fenimore) mechanism must be considered under fuel-rich conditions having relatively high amounts of CH-containing species; at low temperatures and fuel-lean conditions, the importance of the $N_2O$ intermediate mechanism has also been recognized.

The prompt mechanism can lead to either the formation or the destruction of $NO_x$ species. Determining which chemical route dominates is rendered difficult by the complexity of this mechanism. Without wishing to be held to any mechanistic interpretation of the invention, it is believed that the combustion conditions described herein also result in the formation of a fuel rich environment and favor a net destruction of $NO_x$.

Accordingly, carrying out the combustion reaction using low concentrations of oxygen and combustibles, coupled with establishing a fuel-rich combustion region, appears to favor a reduction in NOx generation.

By practicing the invention, the combustion is not concentrated in an intense flame at or near the face of a post-mix burner but is flameless and occurs over a relatively large volume within the furnace; this contributes to a fairly uniform distribution of heat throughout the furnace.

While previous efforts have focused on combusting a fuel stream with an oxidant having a low oxygen concentration, the invention disclosed herein involves a combustion process where the concentration of fuel species and, consequently, that of combustibles capable of reacting with the low oxygen concentrations are also reduced. In addition, establishing a fuel-rich reaction zone favors a decrease in $NO_x$ formation. Enhancing the entrainment of furnace gases containing nonreactive species into both the oxidant and the fuel stream as well as injecting the two streams independently and at points spatially separated from each other contribute to obtaining the conditions desired for carrying out the combustion reaction.

The following examples are presented for illustrative purposes and are not intended to be limiting.

Figure 1C:
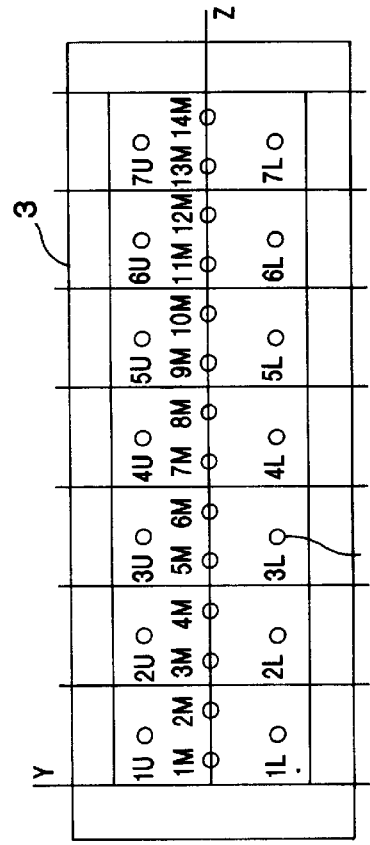
Figure 1A:
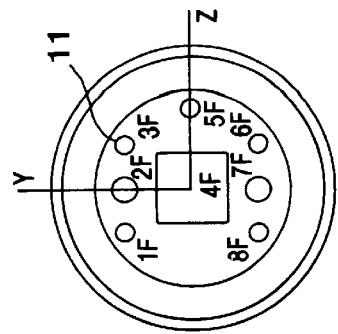

Tests were conducted in a cylindrical-shaped, cast refractory-lined furnace having an inner diameter of 36 in. and an inner length of 126 in. The furnace is shown schematically in FIG. 1, not drawn to scale: 1(a) and 1(d) show, respectively, the furnace front and rear faces or walls, while 1(b) and 1(c) show, respectively, a top and side view of the furnace. The front and rear faces of the furnace are provided with port openings 11. The locations of port openings 11 are shown as 1F through 8F for port openings on the front face of the furnace and as 1R through 7R for port openings on the rear face of the furnace. The side wall of the furnace, FIG. 1(c) had additional side wall port openings 13.

Water-cooled lances positioned in port openings 11 were used to inject fuel or oxidant. The typical lance orifice diameter was between 0.150 in. and 0.700 in. and each lance was used for providing either fuel or oxidant but not both. Tests were conducted for injection arrangements in which fuel and oxidant were introduced into the furnace from the same furnace wall or face (co-firing) or from opposite furnace walls or faces (opposed-firing).

The conditions for the tests were as follows; the furnace wall temperature was maintained constant at about 1370 K (2007° F.); the oxygen concentration measured in the flue was typically between 2–3% (vol. wet) and the firing rate was 185 kW (~0.6 MMBtu/h).

When the oxidant used was pure oxygen, nitrogen could be provided through one or more side port openings 13 to simulate air infiltration in a commercial furnace or a combustion system using oxygen-enriched air. As the nitrogen concentration was varied from 0 to 77%, the oxidant mass flow was adjusted to ensure that the oxygen concentration at the flue was maintained between 2–3% (vol. wet). The modifications in oxygen mass flow were accompanied by changes in the flow velocity of the oxygen; as the nitrogen content in the furnace varied from 0 to 77%, the typical variations in oxygen flow velocity remained below about 15%.

Figure 2:
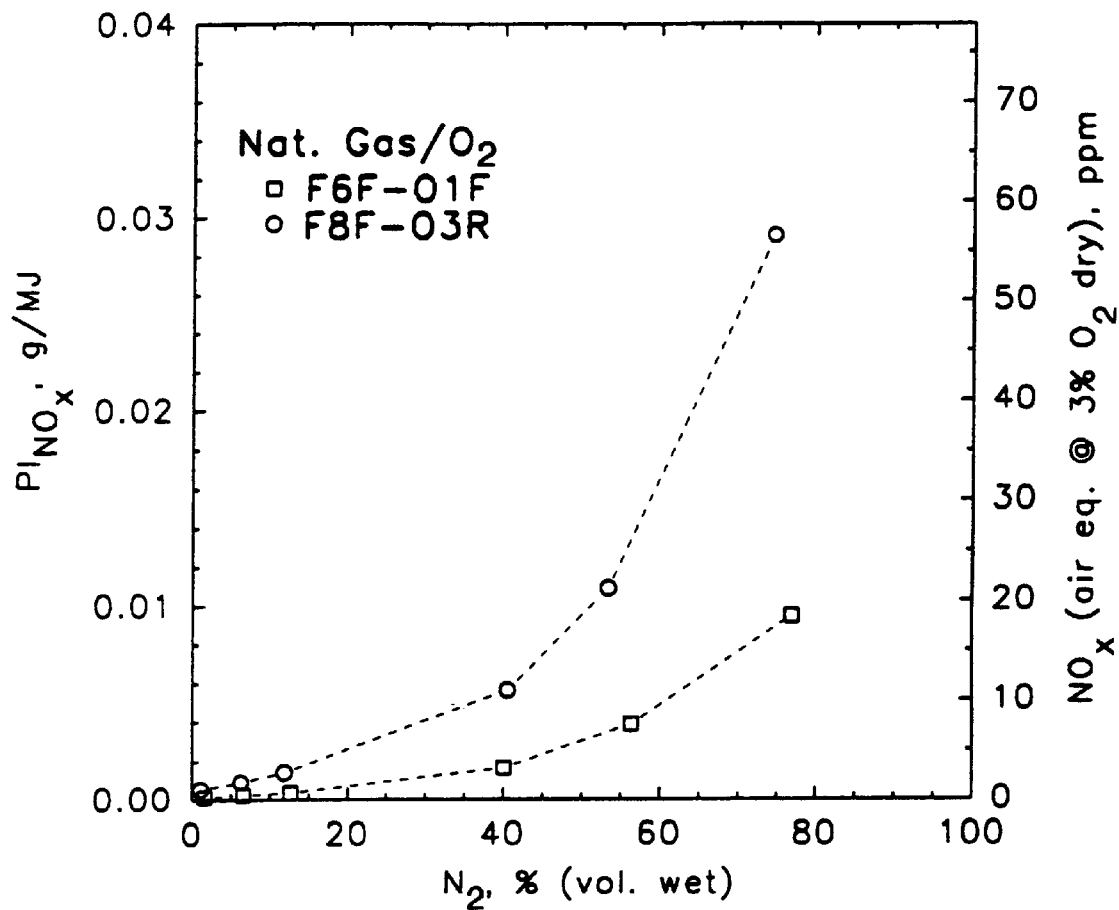
FIG. 2 is a graphical representation of results of several tests of the invention.

A number of co-firing and a number of opposed-firing arrangements were tested. Two typical cases are illustrated in FIG. 2 which is a graphical representation of the $NO_x$ power emission index as a function of nitrogen concentration. The power emission index is defined as the ratio of the mass of pollutant, $NO_x$, emitted to the amount of fuel energy supplied. The square symbols represent the results obtained for a co-firing arrangement (labeled F6F-O1F) in which the fuel (in this case natural gas) was injected through port opening 6F and the oxidant, in this case technically pure oxygen, through port opening 1F. The circle symbols represent results obtained with an opposed-firing arrangement (labeled F8F-O3R) in which fuel (natural gas) was injected through port opening 8F and oxidant (technically pure oxygen) through port opening 3R.

As can be seen from FIG. 2, the dependence of $NO_x$ emissions on furnace nitrogen is linear up to nitrogen concentrations of about 55%. For the co-firing arrangement and nitrogen concentrations below 55%, the $NO_x$ emission is lower than 0.005 g/MJ (~10 ppm air equiv. @ 3% $O_2$ dry). For the opposed-firing arrangement and nitrogen concentrations below 55%, the $NO_x$ emission is higher but below 0.012 g/MJ (~24 ppmd air equiv. @ 3% $O_2$ dry).

In general, CO emissions observed were below 35 ppmd for both co-firing and opposed-firing arrangements.

To further evaluate the combustion process taking place by practicing the invention, tests were performed to measure the presence and the in-furnace distribution of oxygen, methane and carbon monoxide.

For these tests, side port openings 13 provided access to the furnace interior allowing for the insertion of the various probes, sampling or diagnostic instruments. No nitrogen was supplied to the furnace and the temperature was maintained at about 2000° F. (1366 K); flue oxygen concentrations were maintained between 2–3% (vol. wet).

Gas samples were extracted from the furnace flue via a water-cooled stainless steel probe and a vacuum pump-based sampling system. After the water was removed, the sample was analyzed for $CO_2$, CO, NO and $O_2$. The molecular weight of $NO_2$ was used for calculation of all appropriate emission indices. Water content in the sample was calculated from a hydrogen atom balance.

Gas samples were also extracted from the furnace interior. Water-cooled, right-angle probes were used to extract gas samples from regions within the fuel or oxidant jet boundary; water-cooled, straight sampling probes were used to extract gas samples from other locations in the furnace interior.

As shown in FIG. 2, somewhat lower $NO_x$ levels were generated in the furnace described herein by co-firing as compared to opposed-firing. Monitoring in-furnace species revealed that the two arrangements also resulted in different $O_2$, CO and $CH_4$ distribution patterns throughout the furnace.

When an opposed-firing arrangement, F6F-O1R (fuel and oxidant injected through lances diagonally opposed and placed, respectively, at port openings 6F and 1R), was tested, in-furnace probing revealed an oxygen-rich environment throughout most of the furnace volume. In several furnace regions, in fact, the $O_2$ concentration was higher than the concentration measured at the flue (2.15% vol. wet). The $O_2$ concentration in the vicinity of the fuel jet was found to be about 5%.

CO and $CH_4$ species were absent throughout most of the furnace with measurable levels of these species detected only in the furnace plane which contained the fuel injection point.

Figure 3:
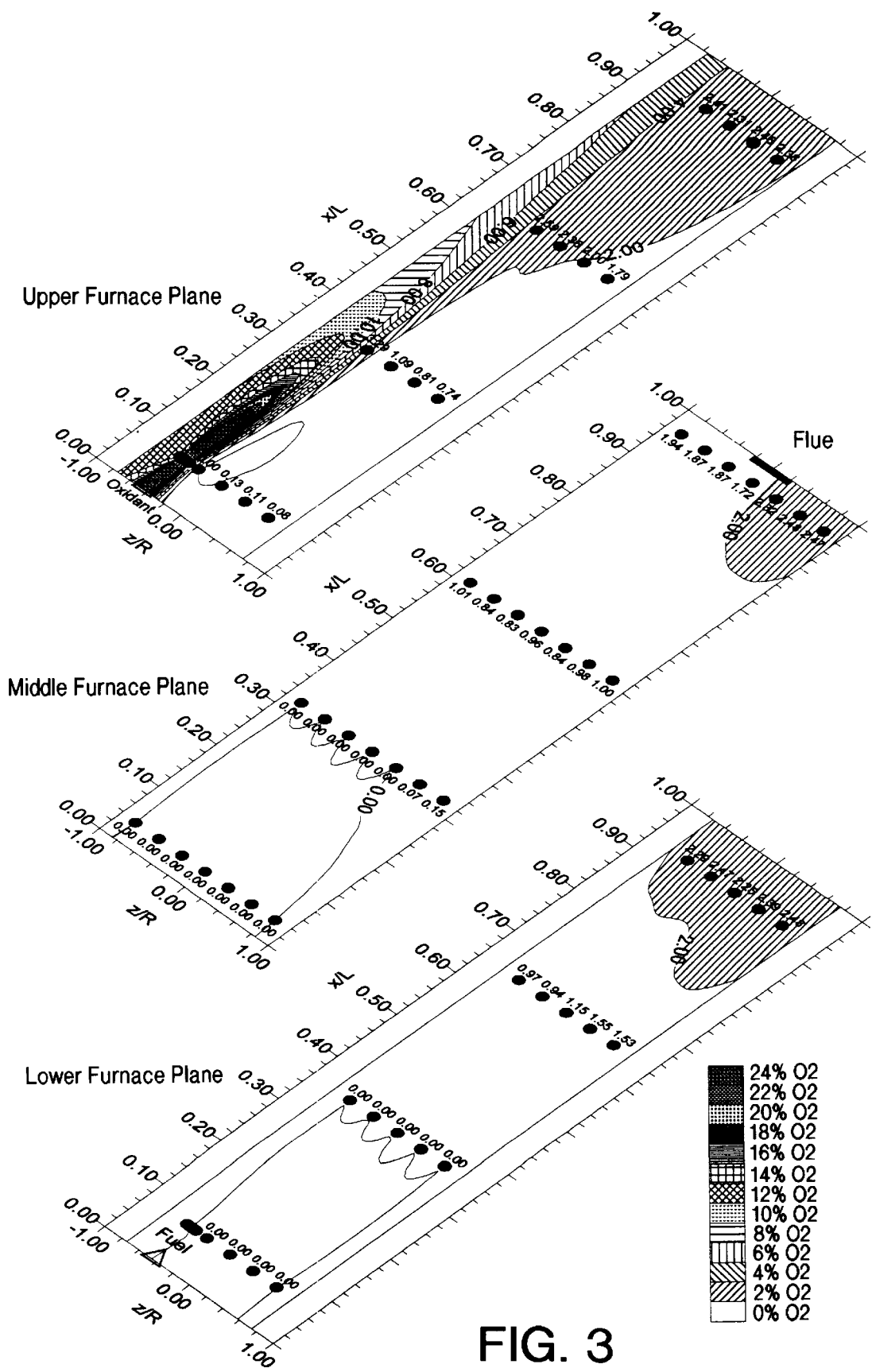
FIGS. 3–5 show concentration measurements for various species in the furnace during various tests of the invention.
Figure 4:
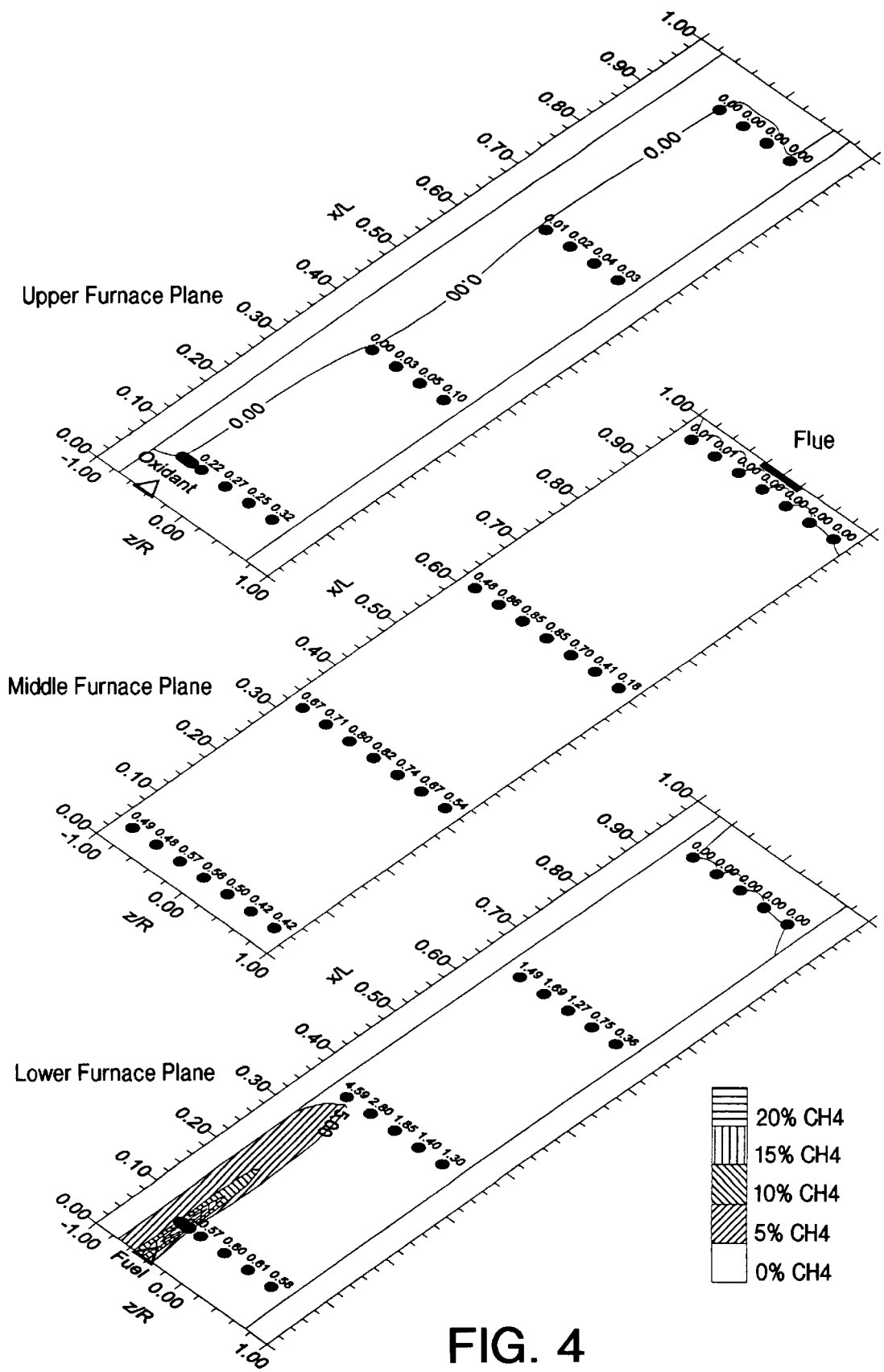
Figure 5:
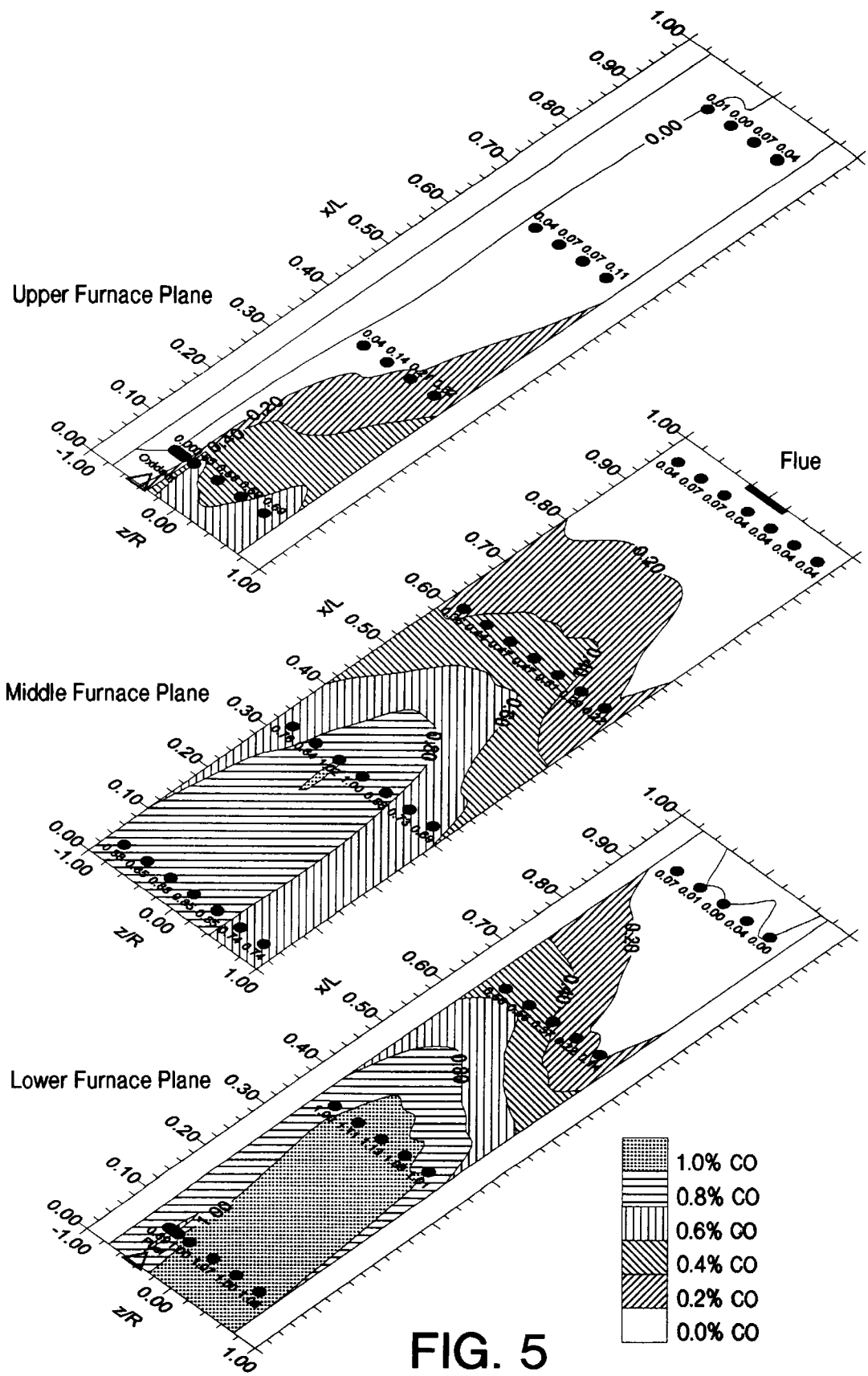

FIGS. 3–5 present the results obtained for a co-firing arrangement, F6F-O1F, where the fuel and oxidant were injected through port openings 6F and 1F, respectively. The presence of the combustion-relevant species is illustrated through contour levels along lower, middle and upper planes cut horizontally through the furnace. For each furnace plane, the measured concentrations are marked by solid circles along with the measured value next to it. FIGS. 3–5 also show the placement of the fuel and oxygen injection points as well as the location of the flue.

FIG. 3 shows that oxygen was absent over a large volume in the furnace; measurable levels of oxygen were concentrated in the upper plane, with a flue oxygen concentration of 2.82% vol. wet.

FIG. 4 illustrates the presence of CO over large regions of the furnace, with particular emphasis in the lower and middle furnace planes.

Measurable methane levels were also found over a large volume of the furnace as shown in FIG. 5.

These experiments suggest that an increased reduction in $NO_x$ can be obtained when, prior to conducting the combustion reaction, the mixing of furnace gases into the oxidant stream and into the fuel stream are maximized, thereby decreasing the concentrations of oxygen and combustibles in the oxidant reactant and fuel reactant, respectively.

In addition, it is believed that achieving a fuel-rich zone containing CH species within the furnace volume may contribute to a reduction in $NO_x$ formation.

Although the invention has been described in detail with reference to certain embodiments, it will be appreciated by those skilled in the art that there are other embodiments within the spirit and scope of the claims.

What is claimed is:

1. A combustion process with reduced generation of $NO_x$ comprising:

(A) providing a furnace containing furnace gases comprising non-reactive species at a temperature exceeding 1000° F.;

(B) providing into the furnace at a fuel injection point a fuel stream comprising combustibles and having at least one of: (i) a swirl motion (ii) a velocity of at least 100 m/s;

(C) providing into the furnace at an oxidant injection point spaced from the fuel injection point, an oxidant stream having an oxygen concentration greater than 21 volume percent and having at least one of: (i) a swirl motion (ii) a velocity of at least 75 m/s;

(D) mixing the fuel stream with furnace gases within the furnace to produce a fuel reactant having a concentration of combustibles which is not more than 10 volume percent before carrying out combustion;

(E) mixing the oxidant stream with furnace gases within the furnace to produce an oxidant reactant having an oxygen concentration which is not more than 10 volume percent before carrying out combustion; and thereafter (F) reacting the fuel reactant with the oxidant reactant.

2. The process of claim 1 wherein the oxidant injection point is on the same furnace wall as the fuel injection point.

3. The process of claim 2 wherein the oxidant injection point is spaced away from the fuel injection point by at least 6 in.

4. The process of claim 1 wherein the oxidant injection point and the fuel injection point are on different furnace walls.

5. The process of claim 1 wherein a plurality of fuel streams are injected into the furnace.

6. The process of claim 1 wherein a plurality of oxidant streams are injected into the furnace.

7. The process of claim 1 wherein the fuel stream provided into the furnace is preheated.

8. The process of claim 1 wherein the oxidant stream provided into the furnace is preheated.

9. The process of claim 1 wherein both the fuel stream and the oxidant stream have a swirl motion.

10. The process of claim 1 wherein only one of the fuel stream and the oxidant stream has a swirl motion.

11. The process of claim 1 wherein neither the fuel stream nor the oxidant stream has a swirl motion.

12. The combustion process of claim 1 wherein the fuel reactant consists essentially of fuel and non-reactive species.

13. The combustion process of claim 1 wherein the oxidant reactant consists essentially of oxygen and non-reactive species.

* * * * *

UNITED STATES PATENT AND TRADEMARK OFFICE
CERTIFICATE OF CORRECTION

PATENT NO. : 6,007,326
APPLICATION NO. : 08/905344
DATED : December 28, 1999
INVENTOR(S) : Ryan, III et al.

It is certified that error appears in the above-identified patent and that said Letters Patent is hereby corrected as shown below:

Column 1, after the title "LOW NOx COMBUSTION PROCESS", and before the heading "FIELD OF THE INVENTION", insert the following sentence:

-- This invention was made with United States Government support under Contract No. DE-FC36-95ID13331 awarded by the Department of Energy. The United States Government has certain rights in the invention. --

Signed and Sealed this

Thirty-first Day of October, 2006

JON W. DUDAS
*Director of the United States Patent and Trademark Office*